United States Patent [19]

Kolb et al.

[11] 4,274,439

[45] Jun. 23, 1981

[54] CONTROL VALVE HAVING A DISC SHAPED THROTTLE

[75] Inventors: Fritz Kolb, Odenthal; Silvan Fehlisch; Otto Ziegert, both of Dormagen; Hans Bender, Mannheim; Manfred Schmitt, Bobenheim-Roxheim, all of Fed. Rep. of Germany

[73] Assignee: Bayer Aktiengesellschaft, Leverkusen, Fed. Rep. of Germany

[21] Appl. No.: 799,616

[22] Filed: May 23, 1977

[30] Foreign Application Priority Data

May 22, 1976 [DE] Fed. Rep. of Germany ....... 2623079

[51] Int. Cl.³ .................... F16K 13/00; F16K 47/02
[52] U.S. Cl. .................. 137/601; 98/121 A; 137/625.28; 49/82; 251/249.5
[58] Field of Search ............... 137/601, 625.28; 49/82, 49/84, 85; 98/121 A; 251/249.5

[56] References Cited

U.S. PATENT DOCUMENTS

| 734,604 | 7/1903 | Plucker | 49/82 X |
|---|---|---|---|
| 1,091,844 | 3/1914 | Holland | 98/121 A |
| 1,519,553 | 12/1924 | Riker | 137/601 X |
| 3,351,091 | 11/1967 | Chambert | 137/601 |
| 3,746,042 | 7/1973 | Finkel | 137/601 |

FOREIGN PATENT DOCUMENTS

50099 9/1965 Poland ..................................... 137/601

Primary Examiner—Arnold Rosenthal
Attorney, Agent, or Firm—Sprung, Felfe, Horn, Lynch & Kramer

[57] ABSTRACT

The invention relates to a throttling valve with low noise. The passage of fluid is controlled by an aperture between parallel discs, which can be turned around special axes for altering the distance between them.

4 Claims, 4 Drawing Figures

CONTROL VALVE HAVING A DISC SHAPED THROTTLE

The invention relates to a control valve comprising a valve housing, a spindle and a disc-shaped throttle element.

In known commercial devices, the noise produced by the throttling is often a nuisance which is intolerable. The noise is usually produced by turbulence which is largely caused by the structure of the valve.

Some such control valves are made to produce less noise by providing them with parts for reducing the sound, which are partially parallel-mounted or series-mounted, and which may comprise perforated discs, sintered rings, gratings or a heap of loose resisting bodies, wherein some of these parts are only partially released by mechanical closure elements to produce a predetermined cross-section of flow.

A major disadvantage of these devices is that the amount of adjustment of the cross-section needed to regulate the flow of material to a particular level does not coincide with the adjustment which produces the greatest reduction in sound in the various operating conditions, since the sound-reducing properties of the construction are generally only fully effective at one flow rate for example, the maximum flow rate or the average flow rate.

The object of the invention is to provide a control valve which produces a low noise level, in which adjustments of the throttle section to provide any given flow rate also given the required geometry of the throttle section, and in which the amount of noise produced is low even when the pressure tension is released supercritically.

According to the invention there is provided a control valve for controlling fluid flow comprising a valve housing, a set of parallel discs rotatably mounted in the housing with a clearance between adjacent discs which is variable by rotation of the discs, and a roller sealing element arranged between each end of the set of discs and the housing. The invention and embodiments thereof have a number of advantages. Thus, the invention splits up the flow into small eddy fields with the formation of only small sounds, and the sound they produce is readily absorbed on account of its high frequency. The clearance between the discs may be altered by rotating the individual discs around their respective axis so that any desired throttle effect may be simple and reproducible adjustment. The throttle may be made by a progressively adjusted at a high reaction velocity over the entire range from the closed position to the completely open position. Furthermore, the plates are self-cleaning as a result of their direct contact.

The control valve of the invention is simple and easy to service.

In a particular embodiment, the discs, which are of equal thickness, wider in the direction of flow corresponding to the increase in the volume of the fluid as its pressure drops.

Allowances are made for the increase in volume by means of the discs, the width of which increases in the direction of flow, with equal clearances, which is advantageous from the point of view of the dissipation the energy formed during throttling and thus the sound.

In another embodiment, roller sealing elements and discs are arranged transversely to the inlet nozzle, so that this nozzle may be connected to the adjustable throttling clearances between the discs by means of bore-holes.

It has proved particularly advantageous to feed the fluid centrally and then distribute it radially, as the volume then increases simultaneously to fill a surrounding annular channel.

In another embodiment, holes are provided in the discs which become larger in the direction of flow.

This enables the fluid to be distributed evenly between all of the discs. In this way, sound is prevented from building up.

As in the conventional embodiment, the ratio of the maximum clearance to the thickness of the discs is less than or equal to 1:5.

By restricting the clearance, it is possible to prevent the individual streams flowing from the clearance from forming another common free jet before they slow down, which would produce a substantially louder noise.

In the accompanying drawings which show two embodiments of the invention:

Figure 1:
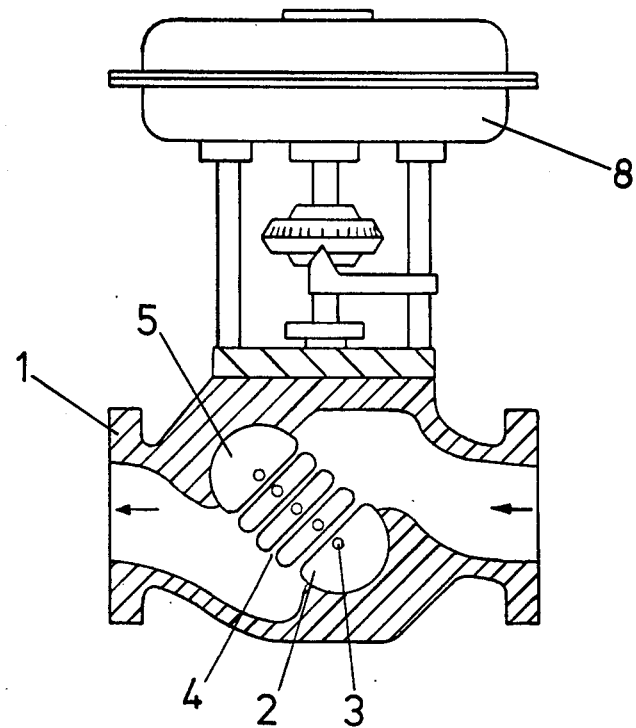
FIG. 1 is a section through a control valve having disc-shaped throttle elements.

FIG. 1 shows a set of discs 2 having fixed axes 3 arranged rotatably in a valve housing 1 in such a way that there are clearances 4 between them. Rolling sealing elements 5 are arranged between the set of discs 2 and the walls of the valve housing 1. There is no clearance between the discs if they are rotated through a predetermined angle in either direction. The medium can then no longer flow between the discs.

Figure 2:
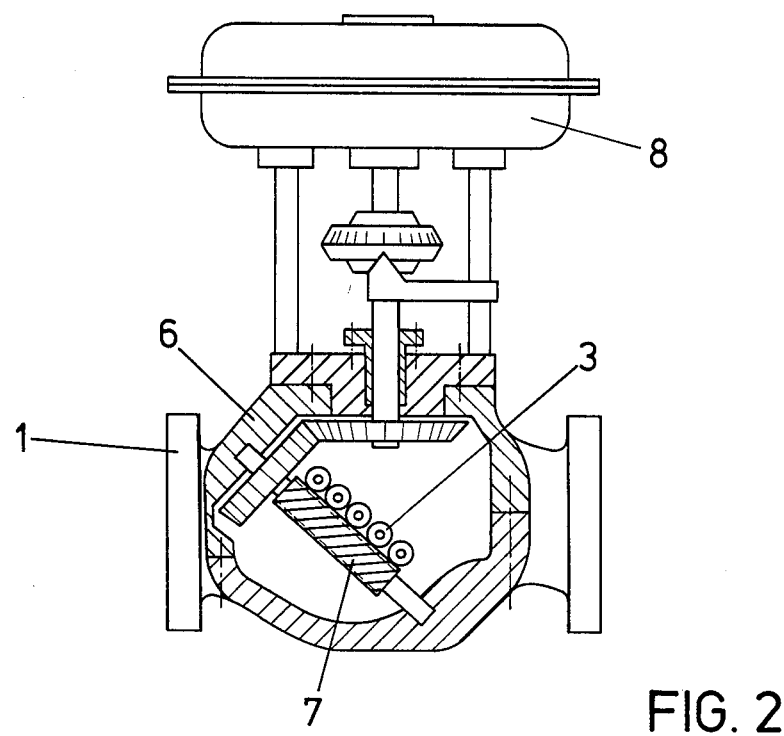
FIG. 2 is a section through a control device for the valve of FIG. 1.

FIG. 2 shows the axes 3 of the discs 2 extend at one end to engage a cogged mechanism 7 contained in a gear box casing 6 connected to the valve housing 1 and driven by a drive 8.

Figure 3:
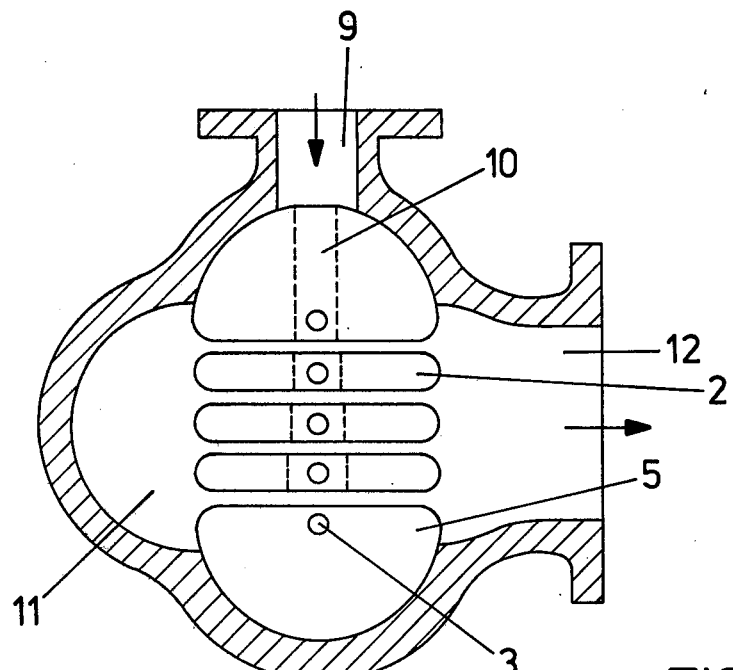
FIG. 3 is a section through a control valve having perforated disc-shaped throttle elements.

FIG. 3 shows the sealing element 5 and discs 2 which are rotatable about the axes 3, located beneath an inlet nozzle 9. The fluid flows through a hole 10 in the discs 2 and spreads radially to the surrounding annular channel 11 to leave the valve housing 1 at right angles to the inlet nozzle via an outlet nozzle 12.

Figure 4:
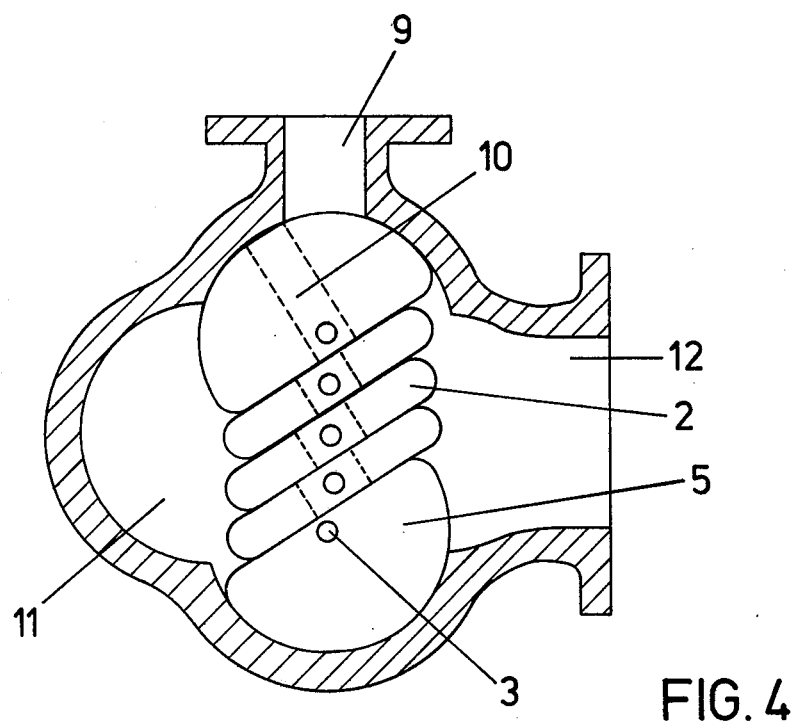
FIG. 4 is a sectional view showing the control valve of FIG. 3 in the closed position.

FIG. 4 shows the sealing element 5 and discs 2 rotated into a closed position.

What we claim is:

1. A control valve for controlling fluid flow comprising a valve housing, a set of parallel spaced apart superposed flat discs all having their main surfaces lying in parallel planes, means mounting each disc in the housing for rotation in the same direction about an axis parallel to the plane of the disc to effect a variable clearance ranging from zero to a maximum clearance between adjacent discs which is adjustable in response to rotation of the discs in the same direction, wherein the ratio of the maximum clearance to the thickness of the disc is less than or equal to 1:5, and a roller sealing element disposed between each end of the set of discs and the housing.

2. A control valve as claimed in claim 1, wherein the valve housing comprises a fluid inlet nozzle and wherein the roller sealing elements and discs are arranged transversely to the fluid inlet nozzle and wherein one sealing element and the discs include longitudinal holes which communicate with the clearances and the inlet nozzle.

3. A control valve as claimed in claim 2, wherein the said holes increased in size in the direction of fluid flow.

4. A control valve according to claim 1, further comprising gear means connected to the axes of rotation of the discs and means for driving the gear means to effect rotation of the discs about their axes.

* * * * *

UNITED STATES PATENT AND TRADEMARK OFFICE
CERTIFICATE OF CORRECTION

PATENT NO. : 4,274,439
DATED : Jun. 23, 1981
INVENTOR(S) : Fritz Kolb et al

It is certified that error appears in the above-identified patent and that said Letters Patent are hereby corrected as shown below:

Title Page    Insert --Erdölchemie GmbH, Koeln,
Assignee      Fed. Rep. of Germany--.

Signed and Sealed this

Twenty-ninth Day of December 1981

[SEAL]

Attest:

GERALD J. MOSSINGHOFF

Attesting Officer    Commissioner of Patents and Trademarks